United States Patent [19]
Adachi

[11] Patent Number: 5,654,667
[45] Date of Patent: Aug. 5, 1997

[54] LINEAR PREDICTIVE DIFFERENTIAL DETECTION METHOD FOR DPSK WAVES

[75] Inventor: Fumiyuki Adachi, Yokohama, Japan

[73] Assignee: NTT Mobile Communications Network, Inc., Tokyo, Japan

[21] Appl. No.: 600,951

[22] PCT Filed: Aug. 1, 1995

[86] PCT No.: PCT/JP95/01517

§ 371 Date: Feb. 22, 1996

§ 102(e) Date: Feb. 22, 1996

[87] PCT Pub. No.: WO96/05680

PCT Pub. Date: Feb. 22, 1996

[30] Foreign Application Priority Data

Aug. 8, 1994 [JP] Japan .................................. 6-186098
Aug. 30, 1994 [JP] Japan .................................. 6-205047

[51] Int. Cl.⁶ .................................................. H04L 27/22
[52] U.S. Cl. .......................... 329/306; 375/324; 375/331
[58] Field of Search ................................ 329/304, 306, 329/310; 375/324, 329, 330, 331

[56] References Cited

U.S. PATENT DOCUMENTS 5,202,643 4/1993 Sato ........................................ 329/310

FOREIGN PATENT DOCUMENTS 6-152670 5/1994 Japan .
6-177928 6/1994 Japan .

OTHER PUBLICATIONS

Adachi, F. and Sawahasi, M., "Viterbi–Decoding Differential Detection of DPSK," *Electronics Letters*, vol. 28, No. 23, Nov. 5, 1992, pp. 2196–2198.

Adachi, F. and Sawahasi, M., "Decision Feedback Differential Detection of Differentially Encoded 16APSK Signals," *Technical Report of the IEICE*, MW93–19, RCS93–2, vol. 93, No. 77, May 27, 1993, pp. 7–14.

*Primary Examiner*—Siegfried H. Grimm
*Attorney, Agent, or Firm*—Pollock, Vande Sande & Priddy

[57] ABSTRACT

In a reference signal adaptive estimation part 15, a received signal sample $\hat{z}_{n-2}$ at time (n–2) is phase rotated by M states $\Delta\phi_{n-1}$ at time (n–1), and the phase-rotated signal and a received signal sample $z_{n-1}$ are used to calculate the following linearly predicted value of the received signal sample at time (n–1) that contains a fading variation at time n, $$\hat{z}_{n-1} = (1+\lambda)z_{n-1} - \lambda z_{n-2}\exp(j\Delta\phi_{n-1}).$$

A square error between a signal phase-rotated $\Delta\phi_n$ from the linearly predicted value $\hat{z}_{n-1}$ and a received signal sample $z_n$ is calculated as a branch metric in a branch metric calculating part 16 and this branch metric is used for decoding in a Viterbi decoding part 17. A prediction coefficient $\lambda$ is determined by a sequential error minimizing algorithm in such a manner as to minimize a weighted sum of a squared error between the received signal sample at each point in time tracing back along each survival path and its predicted value, after determining survival paths that reach M states $\Delta\phi_n$ at time n.

10 Claims, 7 Drawing Sheets

LINEAR PREDICTIVE DIFFERENTIAL DETECTION METHOD FOR DPSK WAVES

TECHNICAL FIELD

The present invention relates to a differential detection method that is used, for example, in mobile radio communications to demodulate phase-modulated signals by estimating their most likely state from a previous or past detected symbol sequence in an M-level differential phase modulation system commonly referred to as M-phase DPSK (M being a positive integer).

Coherent detection and differential detection are widely used for the demodulation of phase-modulated signals. In the coherent detection, the receiving side regenerates a carrier, then measures the phase of the received signal, using the regenerated carrier as a reference signal, and decides a transmitted symbol. In this instance, since the absolute phase of the transmitted signal is unknown, the transmitting side usually employs a differential phase modulation (DPSK) scheme which puts information on a phase difference $\Delta\phi$. This coherent detection features an excellent error rate characteristic because the reference signal regenerated for coherent detection is insusceptible to agitation by thermal noise, but in a fading environment where the phase of the received signal varies, the phase of the regenerated reference signal cannot follow the phase variation and the performance deteriorates accordingly.

On the other hand, the conventional differential detection method uses, as the reference signal, a received signal $z_{n-1}$ delayed by one symbol period to decide that $\Delta\phi_n = \Delta\hat\phi_n$ which maximizes $\text{Re}\{z_n z^*_{n-1} \exp(-j\Delta\phi_n)\}$ is a transmitted symbol. Here, $z_n$ is a complex representation of the received signal, Re a real part and * a complex conjugate. Thus, the differential detection does not need a carrier regeneration circuit, and hence simplifies the detection circuit used and provides a performance superior to that of the coherent detection in the fading environment.

In mobile radio communications, radio waves are received after being reflected by buildings or the like, so that when a mobile station performs transmission and reception while moving, multipath fading occurs in the received signal, causing a transmission error. In such a fading channel the differential detection provides an error rate performance more excellent than does the coherent detection, but as fading becomes faster, a random phase rotation is caused in the received signal and the phase difference between the signals $z_n$ and $z_{n-1}$ becomes different from the transmission phase difference, readily causing an error. Contrary to this, in a no fading channel, the error rate performance is inferior to that obtainable with the coherent detection.

In the meantime, it is proposed, in D. Makrakis and K. Feher, "Optimal noncoherent detection of PSK signals," Electronics Letters, vol. 26, pp. 398–400, March 1990, to bring the error rate in quadrature differential detection close to that obtainable with coherent-detection with differential decoding by a differential detection scheme that makes a maximum likelihood sequence estimation through the use of the Viterbi algorithm.

With the proposed method, however, as fading becomes faster, the error rate performance rather deteriorates because of the random phase rotation of the received signal.

It is therefore an object of the present invention to provide a differential detection method for the M-phase DPSK modulated signal which possesses an excellent error rate performance even in a fast-varying fading environment.

Another object of the present invention is to provide a differential detection method for the M-phase DPSK modulated signal which has a fast fading tracking property and is capable of obtaining an error rate performance close to that by the coherent detection even in no fading environment.

DISCLOSURE OF THE INVENTION

In a first aspect, the present invention is directed to a differential detection method for an M-level differentially phase-modulated signal, M being an integer equal to or greater than 3, the method comprising the steps of:

(a) sampling a received signal with a transmitted symbol period to obtain received signal samples $z_n$ at a series of points in time n;

(b) rotating the phase of a received signal sample $z_{n-2}$ at time (n–2) by one, $\Delta\phi_{n-1}$, of M states and calculating a linearly predicted value $\hat{z}_{n-1}$ of a received signal sample $z_{n-1}$ at time (n–1) containing a fading variation at time n on the basis of the phase-rotated signal and the received signal sample $z_{n-1}$ at time (n–1) by the following equation setting a prediction coefficient $\lambda$ as a real number, $$\hat{z}_{n-1} = (1+\lambda)z_{n-1} - \lambda z_{n-2}\exp(j\Delta\phi_{n-1});$$

(c) rotating the phase of said linearly predicted value $\hat{z}_{n-1}$ by $\Delta\phi$ and calculating a square error between the phase-rotated signal and the received signal sample $z_n$ at time n, $\mu(\Delta\phi_{n-1} \to \Delta\phi_n) = |z_n - \hat{z}_{n-1}\exp(j\Delta\phi_n)|^2$, as a branch metric representing the likelihood of transition from the state $\Delta\phi_{n-1}$ at time (n–1) to the state $\Delta\phi_n$ at time n;

(d) adding said branch metric to a branch metric $H(\Delta\phi_{n-1})$ in the state $\Delta\phi_{n-1}$ at time (n–1) to obtain a path metric of a candidate sequence which passes through the state $\Delta\phi_{n-1}$;

(e) repeating the above steps (b) to (d) for one state $\Delta\phi_n$ at time n for all of the M states $\Delta\phi_{n-1}$ at time n–1 to obtain path metrics $H(\Delta\phi_n|\Delta\phi_{n-1})$ for respective M candidate sequences, comparing the M path metrics $H(\Delta\phi_n|\Delta\phi_{n-1})$ in terms of magnitude, calculating a state $\Delta\phi'_{n-1}$ that provides the minimum path metric, storing it in a path memory as the state at time (n–1) on a survival path that reaches the state $\Delta\phi_n$ at time n, and storing its path metric $H(\Delta\phi_n|\Delta\phi'_{n-1})$ in a metric memory as a path metric $H(\Delta\phi_n)$ in the state $\Delta\phi_n$ at time n; and (f) repeating the steps (b) to (e) for all of the M states $\Delta\phi_n$ at time n to obtain M path metrics, comparing the M path metrics in terms of magnitude, calculating a state $\Delta\phi'_n$ that provides the minimum path metric, tracing back the path memory by a fixed number K of points in time starting at the state $\Delta\phi'_n$, and outputting the thus reached state as a decoded symbol $\Delta\tilde\phi_{n-K}$.

In a second aspect, the present invention relates to a differential detection method for an M-level differentially phase-demodulated signal, M being an integer equal to or greater than 3, the method comprising the steps of:

(a) sampling a received signal with a transmitted symbol period to obtain a received signal sample $z_n$ at time n;

(b) rotating the phase of a received signal sample $z_{n-2}$ at time n by a phase difference state $\Delta\tilde\phi_{n-1}$ decided at the immediately preceding time (n–1) and calculating a linearly predicted value $\hat{z}_{n-1}$ of a received signal sample at time (n–1) containing a fading variation at time n on the basis of the phase-rotated signal and a received signal sample $z_{n-1}$ by the following equation setting a prediction coefficient $\lambda$ as a real number, $\hat{z}_{n-1} = (1+\lambda)z_{n-1} - \lambda z_{n-2} \exp(j\Delta\bar{\phi}_{n-1})$;

(c) rotating the phase of said linearly predicted value $\hat{z}_{n-1}$ by $\Delta\phi_n$ to obtain a candidate for a received signal at time n, and calculating a real value of the inner product of the received signal candidate and the received signal sample $z_n$ as a branch metric $\mu(\Delta\phi_n)$ of transition from the state $\Delta\bar{\phi}_{n-1}$ at time (n−1) to the state at time n; and (d) repeating said steps (b) and (c) for all of M states $\Delta\phi_n$ at time n, comparing M resulting branch metrics in terms of magnitude, calculating a state $\Delta\phi_n$ that provides the maximum branch metric, and outputting it as a decoded symbol $\Delta\bar{\phi}_n$.

In a third aspect, the present invention relates to a differential detection method for an M-level differentially phase-modulated signal, M being an integer equal to or greater than 3, the method comprising the steps of:

(a) sampling a received signal with a transmitted symbol period to obtain a received signal sample at time n;

(b) rotating the phase of a reference signal $\hat{z}_{n-2}$ used at time (n−1) by $\Delta\phi_{n-1}$, and calculating an estimated value $\hat{z}_{n-1}$ to be used at time n on the basis of the phase-rotated signal and a received signal sample $z_{n-1}$ by the following equation setting a prediction coefficient $\lambda$ as a real number, $\hat{z}_{n-1} = (1+\lambda)z_{n-1} - \lambda\hat{z}_{n-2} \exp(j\Delta\phi_{n-1})$;

(c) calculating, as a branch metric, a square error between a signal phase-rotated $\Delta\phi_n$ from said estimated reference signal $\hat{z}_{n-1}$ and the received signal sample $z_n$;

(d) adding said branch metric to the path metric in a state $\Delta\phi_{n-1}$ at time (n−1) to obtain the path metric of a candidate sequence that passes through the state $\Delta\phi_{n-1}$;

(e) repeating said steps (b) to (d) for all of M states $\Delta\phi_{n-1}$ at time (n−1) in connection with one state $\Delta\phi_n$ at time n to obtain M path metrics for M candidate sequences, comparing the M path metrics in terms of magnitude, calculating a state $\Delta\phi'_{n-1}$ that provides the minimum path metric, storing it in a path memory as the state of a survival path at time (n−1) that reaches the state $\Delta\phi_n$ at time n, and storing the path metric of the survival path as the path metric in the state $\Delta\phi_n$ at time n in a metric memory; and (f) repeating said steps (b) to (e) for all of M states $\Delta\phi_n$ at time n to obtain M path metrics, comparing the M path metrics in terms of magnitude, calculating a state $\Delta\phi'_n$ that provides the minimum path metric, tracing back said path memory by a fixed number K of points in time from the state $\Delta\phi'_n$, and outputting the thus reached state as a decoded symbol $\Delta\bar{\phi}_{n-K}$.

In a fourth aspect, the present invention relates to a differential detection method for an M-level differentially phase-modulated signal, M being an integer equal to or greater than 3, the method comprising the steps of:

(a) sampling a received signal with a transmitted symbol period to obtain a received signal sample $z_n$ at time n;

(b) rotating the phase of a reference signal $z_{n-2}$ at time n by a phase difference state $\Delta\bar{\phi}_{n-1}$ decided at the immediately preceding time (n−1) and calculating an estimated value $\hat{z}_{n-1}$ of a reference signal at time n on the basis of the phase-rotated signal and a received signal sample $z_{n-1}$ by the following equation setting a prediction coefficient $\lambda$ as a real number, $\hat{z}_{n-1} = (1+\lambda)z_{n-1} - \lambda\hat{z}_{n-2} \exp(j\Delta\bar{\phi}_{n-1})$;

(c) rotating the phase of said estimated value $\hat{z}_{n-1}$ by $\Delta\phi_n$ to obtain a candidate for a received signal at time n, and calculating a real value of the inner product of the received signal candidate and the received signal sample $z_n$ as the branch metric of transition from the state $\Delta\bar{\phi}_{n-1}$ at time (n−1) to the state $\Delta\phi_n$ at time n; and (d) repeating said steps (b) and (c) for all of M states $\Delta\phi_n$ at time n, comparing M thus obtained branch metrics in terms of magnitude, calculating a state $\Delta\phi_n$ that provides the maximum branch metric, and outputting it as a decoded symbol $\Delta\bar{\phi}_n$.

In the first or third aspect, after calculation of the survival sequences in the M states $\Delta\phi_n$, the prediction coefficient $\lambda$, which minimizes an error between the received signal sample and its linearly predicted value, may also be calculated tracing back each survival sequence through the use of a recursive error minimizing algorithm.

In the second or fourth aspect, after calculation of the decoded symbol $\Delta\bar{\phi}_n$, the prediction coefficient $\lambda$, which minimizes an error between the received signal sample and its linearly predicted value, may also be calculated tracing back the decoded sequence through the use of a recursive error minimizing algorithm.

BEST MODE FOR CARRYING OUT THE INVENTION

FIRST EMBODIMENT

Figure 1:
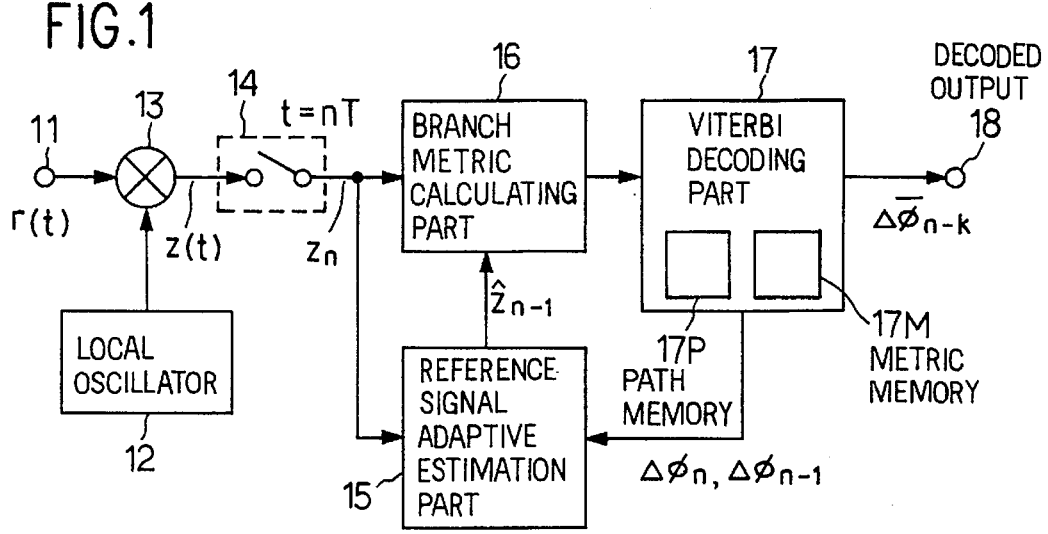
FIG. 1 is a block diagram illustrating an example of a differential detector in accordance with a first embodiment of the differential detection method of the present invention.
Figure 2:
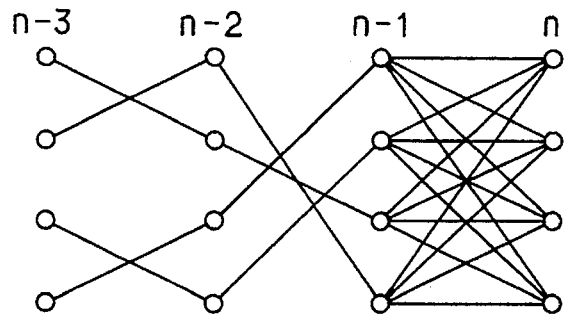
FIG. 2 is a trellis diagram for making sequence estimation in the case of a four-phase DPSK modulated signal.

In FIG. 1 there is illustrated in block form a differential detector circuit employing the differential detection method of a first embodiment of the present invention. A received M-phase DPSK signal r(t) via an input terminal 11 is applied first to a quasi-coherent detector 13, wherein it is frequency converted by a local signal from a local oscillator 12 into a base band signal z(t). The base band signal z(t) is fed to a sampling circuit 14, wherein it is sampled to obtain a sample value $z_n$ at time t=nT every transmitted symbol period T, which value will hereinafter be referred to as a sample value of the received signal at time n. In the description of the present invention signals will be expressed in complex representation, for convenience sake. That is to say, when the carrier frequency of the received signal r(t) is represented by $f_c$ and the received signal phase by $\eta(t)$, the received signal r(t) is expressed by $R(t)\cos\{2\pi f_c t+\eta(t)\}$, but in complex representation it is $r(t)=R(t)\exp\{j[2\pi f_c t+\eta(t)]\}$. The complex representation of the quasi-coherent detector output is $z(t)=R(t)\exp\{j\eta(t)\}$ and the sample value is represented by $z_n=R_n\exp(j\eta_n)$. In the differential detection of the M-level differentially phase-modulated signal (M-phase DPSK modulated signal), M phase difference states $\Delta\phi=2m\pi/M$, where m=0,1, ..., M−1, are provided at each point in time. FIG. 2 is a trellis diagram showing state transition when M=4. In FIG. 2 there are shown survival paths (sequences) already determined until time (n−1) and all possible branches of transition from the phase difference state $\Delta\phi_{n-1}$ at time (n−1) to the phase difference state at time n (current time). The phase difference state $\Delta\phi$ will hereinafter be referred to simply as a phase state or state.

A reference signal adaptive estimation part 15 generates, as a reference signal, a predicted sample value $\hat{z}_{n-1}$ at time (n−1) which contains a fading variation at time n using sample values $z_{n-1}$ and $z_{n-2}$ at times (n−1) and (n−2) and applies the reference signal to a branch metric calculating part 16. The branch metric calculating part 16 calculates, as the predicted sample value $\hat{z}_{n-1}$ at time (n−1) containing the fading variation at time n, each of M branch metrics indicating the likelihood of transition from M states at the immediately preceding time (n−1) to one state at time n. The same operation is repeated for all the other states at time n. A Viterbi decoding part 17 sequentially estimates transmitted phase difference sequences by the Viterbi algorithm. That is, the Viterbi decoding part calculates, on the basis of the branch metrics, path metrics indicating the likelihood of sequences that reach each state at time n, then selects the state at the immediately preceding time (n−1) from which the path most likely to reach each state at time n originates, and stores, for each state, the path history and the path metric in a path memory 17P and a metric memory 17M, respectively. Further, the Viterbi decoding part traces back the path of the minimum one of the path metrics in the M states at time n by a fixed number of points in time and outputs a decoded symbol to an output terminal 18. In the embodiments of the present invention that will hereinafter be described, however, in the case of using a square error between the received signal sample and the reference signal as the branch metric indicating the likelihood of transition, the smaller the square error, the stronger the likelihood of transition of the branch. Hence, the smaller the path metric that is the sum of branch metrics along the survival path, the stronger the likelihood of the survival path. Conversely, in the case of using, as the branch metric, the real-number value of the inner product of the received signal sample and the phase-rotated reference signal, the larger the branch metric is, the stronger the likelihood of state transition of the branch is.

The differential detection according to the first embodiment is carried out as described below.

(a) When it is decided which of the M phase difference states $\Delta\phi_{n-1}$ at time (n−1) is most likely to reach one of the states $\Delta\phi_n$ at time n, the received signal sample $z_{n-2}$ at time (n−2) is phase rotated by $\Delta\phi_{n-1}$ and a linearly predicted value $\hat{z}_{n-1}$ of the received signal sample $z_{n-1}$ at time (n−1) containing a fading variation at predicted time n is calculated on the basis of the phase-rotated signal and the received signal sample $z_{n-1}$ at time (n−1) by the following equation setting the prediction coefficient $\lambda$ as a real number:

$$\hat{z}_{n-1}=(1+\lambda)z_{n-1}-\lambda z_{n-2}\exp(j\Delta\phi_{n-1}) \qquad (1)$$

Eq. (1), if rewritten, becomes as follows:

$$\hat{z}_{n-1}-z_{n-1}=\lambda\{z_{n-1}-z_{n-2}\exp(j\Delta\phi_{n-1})\} \qquad (2)$$

The difference in the braces on the right-hand side of Eq. (2) represents the difference between received signal samples caused by a fading variation from time (n−2) to (n−1); when fading is substantially constant, $z_{n-1}-z_{n-2}\exp(j\Delta\phi_{n-1})=0$. In the case where fading abruptly changes as in mobile radio communications, however, the difference becomes nonnegligibly large. Eq. (2) means the linear prediction of a fading variation from time (n−1) to n on the basis of the fading variation from time (n−2) to (n−1).

(b) Next, a signal phase-rotated $\Delta\phi_n$ from the linearly predicted value $\hat{z}_{n-1}$ is used as a candidate sample of the received signal at time n and the following square error between it and the received signal sample $z_n$ at time n is calculated as a branch metric $\mu(\Delta\phi_{n-1}\to\Delta\phi_n)$ that represents the likelihood of transition from the state $\Delta\phi_{n-1}$ at time (n−1) to the state $\Delta\phi_n$ at time n.

$$\mu(\Delta\phi_{n-1}\to\Delta\phi_n)=|z_n-\hat{z}_{n-1}\exp(j\Delta\phi_n)|^2 \qquad (3)$$

(c) The branch metric $\mu(\Delta\phi_{n-1}\to\Delta\phi_n)$ is added to the path metric $M(\Delta\phi_{n-1})$ in the state $\Delta\phi_{n-1}$ at time (n−1) to obtain the path metric $H(\Delta\phi_n|\Delta\phi_{n-1})$ of a candidate sequence that passes through the state $\Delta\phi_{n-1}$.

(d) The above steps (a) to (c) for one state $\Delta\phi_n$ at time n are performed for all of the M states $\Delta\phi_{n-1}$ at time (n−1) to obtain path metrics H for M candidate sequences, then these M path metrics H are compared in terms of magnitude and a calculation is made to obtain a state $\Delta\phi'_{n-1}$ that provides the minimum path metric. This state is stored in the path memory 17P as the state of a survival sequence (path) at time (n−1) that reaches the state $\Delta\phi_n$ at time n, while at the same time its path metric $H(\Delta\phi_n|\Delta\phi_{n-1})$ is stored in the metric memory 17M as the path metric $H(\Delta\phi_n)$ in the state $\Delta\phi_n$ at time n.

(e) The above steps (a) to (d) are carried out for all of the M states $\Delta\phi_n$ to obtain M path metrics $H(\Delta\phi_n)$, then the M path metrics are compared in terms of magnitude and a calculation is conducted to obtain a state $\Delta\phi'_n$ that provides the minimum path metric. The path memory is traced by a fixed number K of points in time back from the state $\Delta\phi'_n$ and the state thus reached is outputted as the decoded symbol $\Delta\overline{\phi}_{n-K}$.

In the first embodiment described above, the prediction coefficient $\lambda$ may be a predetermined constant value, but it may also be adaptively set by calculating M survival sequences at time n and tracing back each sequence so that an error between the received signal sample and its linearly predicted value is minimized by a recursive error minimizing algorithm. In such a case, one prediction coefficient is used for each state at time n. The prediction coefficient is determined in such a manner as described below.

In the above-mentioned step (d), letting $\Delta\phi'_{n-i}$ (where i=0, 1, ... ,n-1) represent the sequence on the survival path that reaches the state $\Delta\phi_n$ at time n, the prediction coefficient $\lambda(\Delta\phi_n)$ for predicting a reference signal that is used at the next time (n+1) is selected in such a manner as to minimize an exponentially weighted mean square error that is given by the following equation:

$$J = \sum_{i=0}^{n-1} \beta^i |z_{n-i} - z_{n-1-i} \exp(j\Delta\phi'_{n-i})|^2 \qquad (4)$$

where $\beta$ is a positive forgetting factor equal to or smaller than 1 and $\hat{z}'_{n-i}$ is a predicted reference signal at time (n−i) when it is assumed that the prediction is made using the same prediction coefficient $\lambda(\Delta\phi_n)$ at all preceding points in time; it is given by the following equation.

$$\hat{z}'_{n-1-i} = \{1+\lambda(\Delta\phi_n)\}z_{n-1-i} - \lambda(\Delta\phi_n)z_{n-2-i}\exp(j\Delta\phi'_{n-1-i}) \qquad (5)$$

The prediction coefficient that minimizes Eq. (4) is given by the following equation:

$$\lambda(\Delta\phi_n) = Re\left\{ \sum_{i=0}^{n-1} \beta^i [z_{n-i} - z_{n-1-i}\exp(j\Delta\phi'_{n-1})] \times \right.$$
$$[z_{n-1-i} - z_{n-2-i}\exp(j\Delta\phi'_{n-1-i})]^* \exp(-j\Delta\phi'_{n-i}) \} +$$
$$\sum_{i=0}^{n-1} \beta^i |z_{n-1-i} - z_{n-2-i}\exp(j\Delta\phi'_{n-1-i})|^2 \qquad (6)$$

The prediction coefficient $\lambda(\Delta\phi_n)$ expressed by Eq. (6) can be recursively calculated as follows:

$$\lambda(\Delta\phi_n) = \Theta_n(\Delta\phi_n)/\Omega_n(\Delta\phi_n) \qquad (7)$$

$$\Omega_n(\Delta\phi_n) = |z_{n-1} - z_{n-2}\exp(j\Delta\phi'_{n-1})|^2 + \beta\Omega_{n-1}(\Delta\phi'_{n-1}) \qquad (8)$$

$$\Theta_n(\Delta\phi_n) = Re\{[z_n - z_{n-1}\exp(j\Delta\phi_n)][z_{n-1} - z_{n-2}\exp(j\Delta\phi'_{n-1})]^*\} + \beta\Theta_{n-1}(\Delta\phi'_{n-1}) \qquad (9)$$

where $\Omega_0(\Delta\phi_0) = \delta$ (a small positive real number), $\Theta_0(\Delta\phi_0) = 0$, $z_{-1} = 0$ and $\Delta\phi_0 = 0$. The prediction coefficient $\lambda(\Delta\phi_n)$ thus obtained for each state at time n is used to calculate the reference signal $\hat{z}_n$ by Eq. (1) in step (a) for the sample $z_{n+1}$ at the next time (n+1).

As described above, if fading does not exist, the received signal sample $z_{n-1}$ at time (n−1) ought to be predicted by a $\Delta\phi_{n-1}$ phase rotation of the received signal sample $z_{n-2}$ at time (n−2), but the received signal samples at times (n−2) and (n−1) are influenced differently by the fading. In the first embodiment, the received signal sample $z_{n-1}$ that contains the influence of fading at time (n−1) and a signal obtained by the $\Delta\phi_{n-1}$ phase rotation of the received signal sample $z_{n-2}$ containing the influence of fading at time (n−2) are used to calculate, by Eq. (1), the predicted value $\hat{z}_{n-1}$ of the received signal at time (n−1) whose phase is the sum of a linearly predicted random phase of the fading variation at time n and the signal phase $\Delta\phi_{n-1}$ at time (n−1). Hence, the difference between the signal phase-rotated $\Delta\phi_n$ from the predicted received signal $\hat{z}_{n-1}$ and the received signal $z_n$ is free from the influence of fading variation at time n, if $\Delta\phi_n$ is correct.

Figure 3:
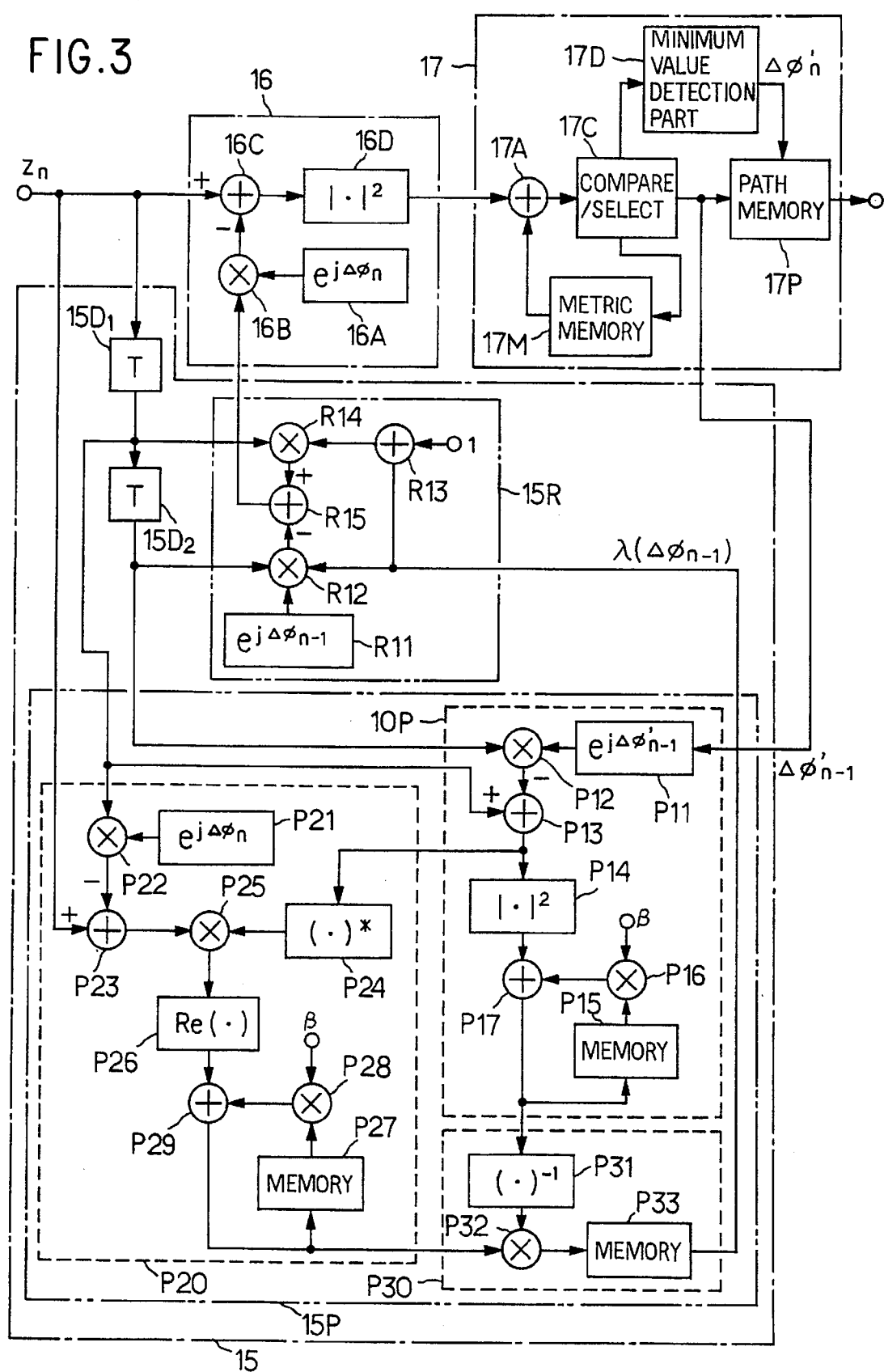
FIG. 3 is a block diagram illustrating the configuration of the differential detector in the case of adaptively determining a prediction coefficient in the first embodiment of the present invention.

FIG. 3 illustrates examples of detailed constructions of the reference signal adaptive estimation part 15 and the branch metric calculating part 16 directly representing Eqs. (5) to (9) in the case of adaptively determining the linear prediction coefficient $\lambda$ described above.

The reference signal adaptive estimation part 15 comprises delays 15D$_1$ and 15D$_2$, a prediction coefficient calculating part 15P and a reference signal calculating part 15R. The prediction coefficient calculating part 15P comprises an $\Omega$ calculating part P10, a $\Theta$ calculating part P20 and a $\lambda$ calculating part P30. The $\Omega$ calculating part P10 is to calculate Eq. (8); in step (d), after the state $\Delta\phi'_{n-1}$ at time (n−1) that provides the minimum path metric for each state at time n is determined in the Viterbi decoding part 17, its phase $\Delta\phi'_{n-1}$ is transformed by a transformation part P11 into a complex form and fed to a multiplier P12, wherein it is multiplied by the sample $z_{n-2}$ at time (n−2) from the delay 15D$_2$. The multiplied output is fed to a subtractor P13, wherein it is subtracted from the sample $z_{n-1}$ at time (n−1) from the delay 15D$_1$ to obtain the absolute value of difference shown in Eq. (8), and the absolute value of the difference is squared by a squarer P14. In a memory P15 there is always held $\Omega_{n-1}$ at the immediately preceding time (n−1) and its output is multiplied by a fixed value $\beta$ in a multiplier P16 and the multiplied output is fed to an adder P17. The adder P17 adds the outputs from the squarer P14 and the multiplier P16 and provides the added output as $\Omega_n$ at time n given by Eq. (8).

On the other hand, in the $\Theta$ calculating part P20 the phase $\Delta\phi_n$ set in the Viterbi decoding part 17 is transformed by a transformation part P21 into a complex form and fed to a multiplier P22, wherein it is multiplied by the sample $z_{n-1}$ at time (n−1) from the delay 15D$_1$, and the multiplied output is subtracted from the sample $z_n$ at time n in a subtractor P23 to obtain the first difference in the right-hand side of Eq. (9). The difference from the subtractor P13 in the $\Theta$ calculating part P10 is transformed by a transformation part P24 into a complex conjugate, which is multiplied by the difference from the subtractor P23 in a multiplier P25. The real part of the multiplied output is calculated in a real part calculating part P26. In a memory P27 there is always held $\Theta_{n-1}(\Delta\phi'_{n-1})$ at the immediately preceding time (n−1), and its output is multiplied by $\beta$ in a multiplier P28, whose multiplied output is added to the output from the real part calculating part P26 to obtain $\Theta_n(\Delta\phi_n)$ at the current time.

The $\lambda$ calculating part P30 calculates the reciprocal of $\Omega_n(\Delta\phi_n)$ from the $\Omega$ calculating part P10 by a divider P31, then multiplies the divided output by $\Theta_n(\Delta\phi_n)$ from the $\Theta$ calculating part P20 by a multiplier P32 to obtain the prediction coefficient $\lambda(\Delta\phi_n)$ at the current time n and updates therewith a memory P33. There is stored the prediction coefficient $\lambda(\Delta\phi_{n-1})$ at time (n−1) in the memory P33 before its updating and the output read out therefrom is fed to the reference signal calculating part 15R. In the reference signal calculating part 15R, the set phase $\Delta\phi_{n-1}$ from the Viterbi decoding part 17 is transformed by a transformer R11 into a complex form and fed to a multiplier R12, wherein the sample $z_{n-2}$ at time (n−2) fed from the delay 15D$_2$ is phase rotated by the output from the transformer R11 and multiplied by the prediction coefficient $\lambda(\Delta\phi_{n-1})$ from the $\lambda$ calculating part P30. On the other hand, the prediction coefficient $\lambda(\Delta\phi_{n-1})$ is added with a constant 1 by an adder R13, then the added output is multiplied by the sample $z_{n-1}$ at time (n−1) from the delay 15D$_1$ and the output from the multiplier R12 is subtracted by a subtractor R15 from the multiplied output to obtain the reference signal $\hat{z}_{n-1}$.

The reference signal $\hat{z}_{n-1}$ is applied to the branch metric calculating part 16, wherein it is phase rotated $\Delta\phi_n$ by a complex phase from a transformer 16A in a multiplier 16B, then the multiplier output is subtracted by a subtractor 16C from the sample $z_n$ at time n and the subtracted output is squared by a squarer 16D to obtain the branch metric $\mu(\Delta\phi_{n-1} \to \Delta\phi_n)$ expressed by Eq. (3).

In the Viterbi decoding part 17, for the respective phases $\Delta\phi_{n-1}$ set in the M states at time (n−1) as described previously, M branch metrics $\mu(\Delta\phi_{n-1} \to \Delta\phi_n)$ provided from the branch metric calculating part 16 are added by an adder 17A to the path metrics H of the corresponding M survival paths read out of the path metric memory 17M to obtain path metrics H of candidate sequences, then they are fed to a compare/select part 17C, wherein they are compared and the phase $\Delta\phi'_{n-1}$ that provides the minimum metric is selected, and it is written into the path memory 17P. By this, M survival paths that reach the respective states $\Delta\phi_n$ at time n are determined. A minimum value detection part 17D reads out the path metrics of these M survival paths from the compare/select part 17C, detects the minimum one of them, then reads out of the path memory 17P the state (phase) $\Delta\phi_{n-K}$ of the detected survival path at time (n–K) going back a predetermined number K of points in time and provides it as the decoded output $\Delta\bar{\phi}_{n-K}$.

Thus, the reference signal adaptive estimation part 15, which embodies the afore-mentioned differential detection method according to the present invention, can be so configured as to conduct calculations expressed by Eqs. (1) through (9). The same is true for other embodiments.

SECOND EMBODIMENT

Figure 4:
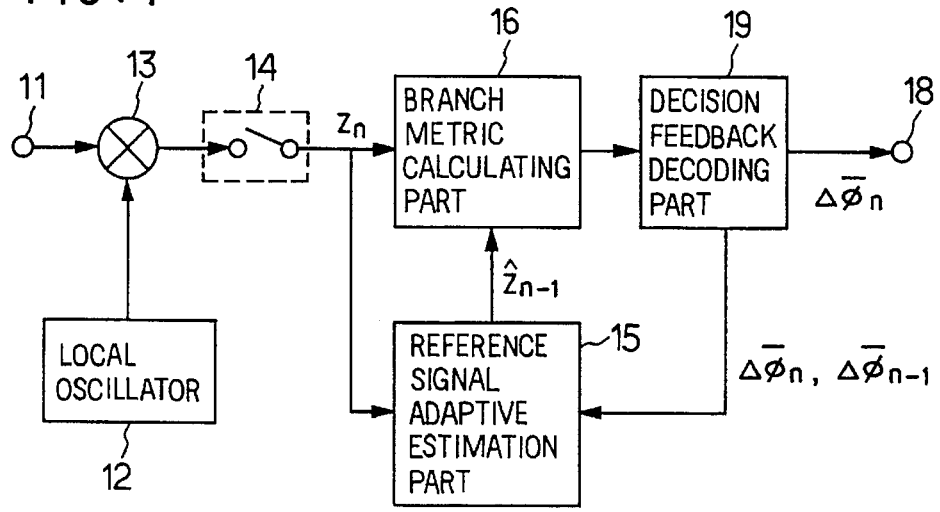
FIG. 4 is a block diagram illustrating an example of a differential detector in accordance with a second embodiment of the differential detection method.

In the first embodiment described above, there are M survival paths at each point in time, but by limiting the number of survival paths to only one at all times, the sequence estimation algorithm can be simplified. In such a case, the Viterbi algorithm decoding becomes decision feedback decoding. FIG. 4 illustrates in block form the differential detector circuit employing a differential detection method in such an instance, the parts corresponding to those in FIG. 1 being identified by the same reference numerals. The received signal sample $z_n$ is fed to the reference signal adaptive estimation part 15 and the branch metric calculating part 16. In the reference signal adaptive estimation part 15, a signal, which is obtained by rotating the signal sample $z_{n-2}$ at time (n–2) by the decoded output phase $\Delta\bar{\phi}_{n-1}$, and the signal sample at time (n–1) are used to calculate the linearly predicted value $\hat{z}_{n-1}$ of the signal sample at time (n–1) containing the fading variation at time (n), and the linearly predicted value is provided as the reference signal to the branch metric calculating part 16. The branch metric calculating part 16 calculates, as the branch metrics $\mu(\Delta\phi_n)$, the real numbers of the inner products of M reference signal candidates obtained by rotating the reference signal $\hat{z}_{n-1}$ by the phases $\Delta\phi_n$ of the M states and the received signal sample $z_n$ at time n. In a decision feedback decoding part 19 the state $\Delta\phi_n$ that provides the maximum one of the M branch metrics $\mu(\Delta\phi_n)$ is calculated and outputted as the decoded symbol.

The prediction differential detection by the second embodiment is performed as described below.

(a) When it is decided which of the M states $\Delta\phi_n$ at time n is most likely to reach the phase difference state $\Delta\bar{\phi}_{n-1}$ at time (n–1), the received signal sample $z_{n-2}$ at time (n–2) is phase rotated by $\Delta\bar{\phi}_{n-1}$ and a linearly predicted value $\hat{z}_{n-1}$ of the received signal sample $z_{n-1}$ at time (n–1), which contains a fading variation at time n when the prediction is made, is calculated from the phase-rotated signal and the received signal sample $z_{n-1}$ by the following equation with the prediction coefficient $\lambda$ set as a real number:

$$\hat{z}_{n-1} = (1+\lambda)z_{n-1} - \lambda z_{n-2} \exp(j\Delta\bar{\phi}_{n-1}) \qquad (10)$$

(b) This linearly predicted value $\hat{z}_{n-1}$ is phase-rotated by $\Delta\phi_n$ to obtain a received signal candidate at time (n–1), and a real-number value $\text{Re}\{z_n \hat{z}^*_{n-1} \exp(-j\Delta\phi_n)\}$ of the inner product of the received signal candidate and the received signal sample $z_n$ is used as the branch metric $\mu(\Delta\phi_n)$ that represents the likelihood of transition from the state $\Delta\bar{\phi}_{n-1}$ at time (n–1) to the state $\Delta\phi_n$.

(c) The above steps (a) and (b) are performed for all of the M states $\Delta\phi_n$ at time n, then the resulting M branch metrics are compared in terms of magnitude and the state which provides the maximum branch metric is calculated and decided to be the decoded symbol $\Delta\bar{\phi}_n$, thereafter being outputted.

In the above-described second embodiment, as is the case with the first embodiment, the prediction coefficient $\lambda$, which minimizes the received signal sample and its linearly predicted value, may be calculated by the recursive error minimizing algorithm tracing back the decoded sequence, after obtaining the decoded symbol $\Delta\bar{\phi}_n$ at time n. In such a case, this embodiment differs from the aforementioned embodiment in that only one survival path exists and that $\Delta\phi_n$ is used in place of $\Delta\bar{\phi}_n$. In the reference signal adaptive estimation part 15, the prediction coefficient $\lambda$ is adaptively updated by the following sequential calculation.

$$\lambda = \Theta_n / \Omega_n \qquad (11)$$

$$\Omega_n = |(Z_{n-1} - Z_{n-2}\exp(j\Delta\phi_{n-1}))|^2 + \beta\Omega_{n-1}$$

$$\Theta_n = \text{Re}\{[Z_n - Z_{n-1}\exp(j\Delta\phi_n)][Z_{n-1}Z_{n-2}\exp(j\Delta\phi_{n-1})]^*\} + \beta\Theta_{n-1}$$

$$\Omega_0 = \delta \text{ (a small positive real number)}, \Theta_0 = 0, z_{-1} = 0, \Delta\phi_0 = 0$$

Figure 5:
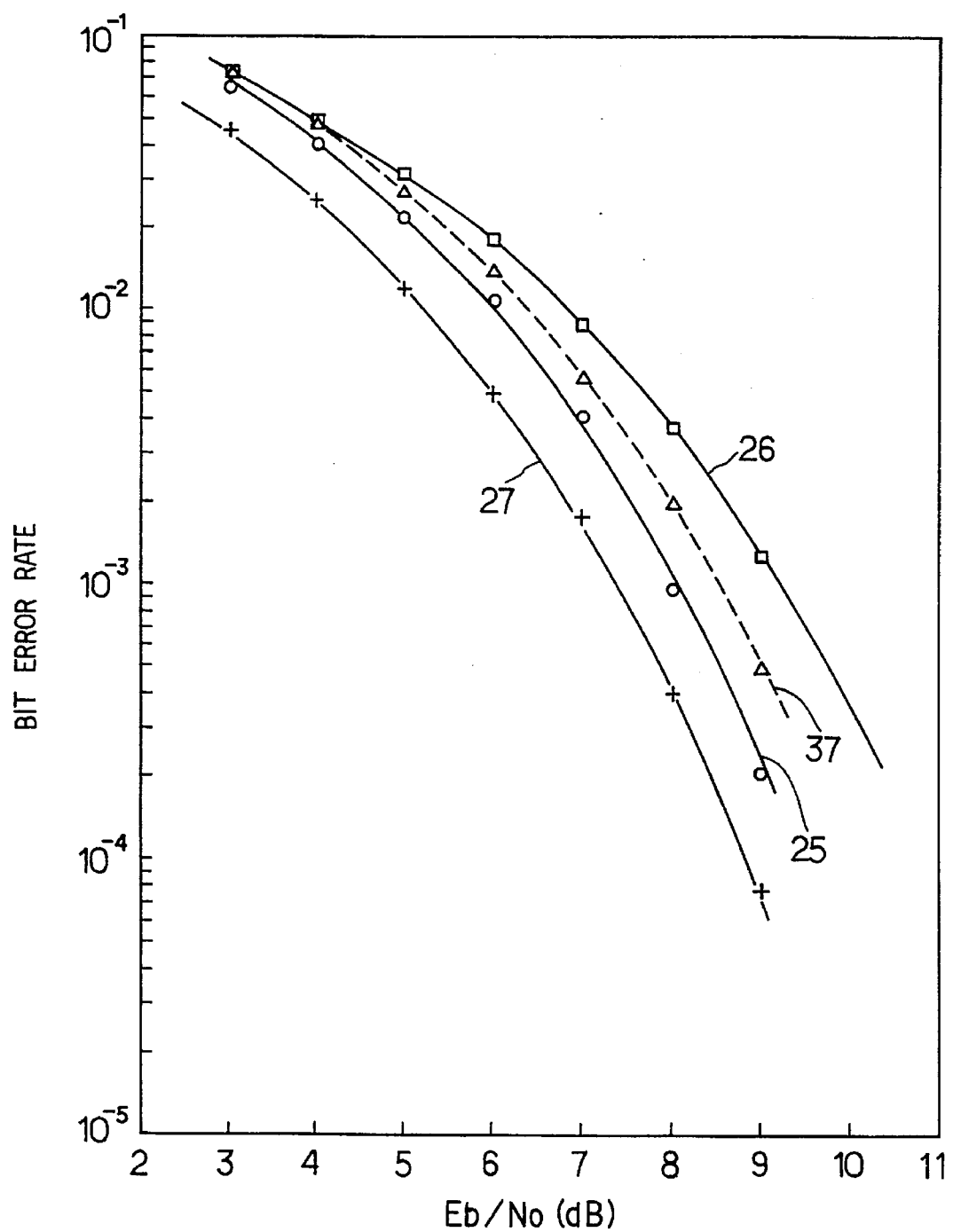
FIG. 5 is a graph showing simulation results on an error rate performance with respect to a signal energy per bit versus noise power spectrum density in the case where the first and second embodiments, which adaptively determine the prediction coefficient, are applied to the four-phase DPSK scheme, together with performances according to the conventional one-symbol differential detection method and coherent-detection, differential decoding method.

In FIG. 5 there are indicated by the solid line 25 computer simulation results of the error rate performance in a no-fading environment in the case where the adaptive determination of the prediction coefficient $\lambda$ in the first embodiment (FIG. 3) is applied to the four-phase DPSK scheme. In this case, $\beta = 1$. The abscissa of FIG. 5 represents the signal energy per bit versus noise power spectrum density ratio $E_b/N_o$. For comparison, there are indicated by the curves 26 and 27 simulation results of the error rate in the cases of the conventional one-symbol differential detection and coherent-detection with differential decoding schemes. The difference between the one-symbol phase differential detection and the coherent-detection, differential decoding in the ratio $E_b/N_o$ necessary for achieving an error rate of 0.1% is 1.8 dB, but as in the first embodiment, the difference can be reduced down to 0.6 dB or less.

Figure 6:
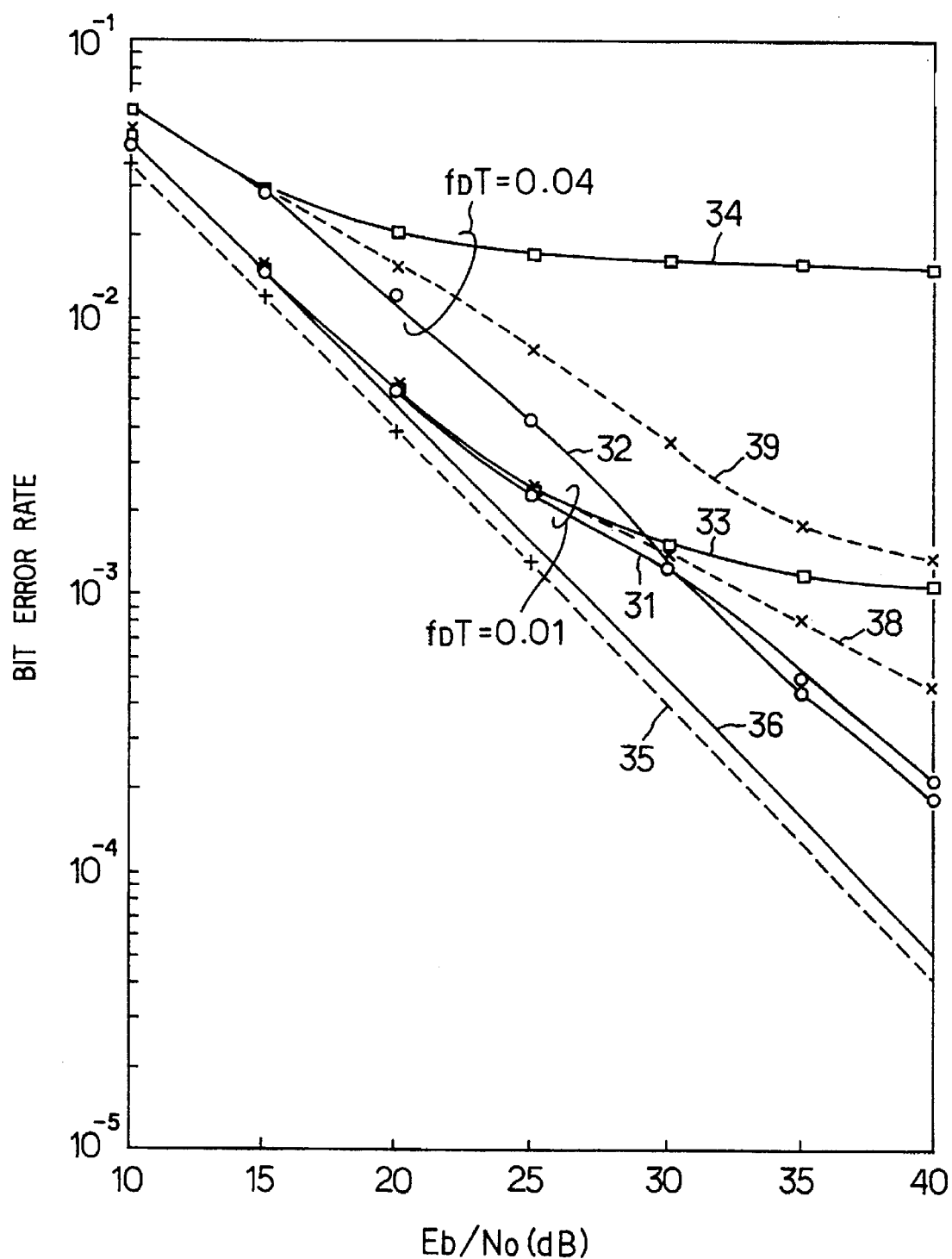
FIG. 6 is a graph showing performances similar to those in FIG. 5 but in the Rayleigh fading environment.

In FIG. 6 there are indicated by the solid lines 31 and 32 bit error rate performances in a Rayleigh fading environment when the afore-mentioned DPSK scheme is applied to the first embodiment. The abscissa represents a mean $E_b/N_o$ ratio. The solid line 31 indicates the case where $f_D T = 0.01$ and the solid line 32 the case where $f_D T = 0.04$, where $f_D t$ represents the rate of fading variation, $f_D$ the maximum Doppler frequency (speed of travel of mobile terminal/wavelength of radio carrier) and T the length of one symbol (where 1/T is the transmission rate). The performances by the conventional one-symbol differential detection method in the cases of $f_D t = 0.01$ and 0.04 are indicated by the curves 33 and 34, respectively. For comparison, there are indicated by the curves 35 and 36 the performances obtained with the coherent-detection, differential decoding method and the conventional differential detection method when fading varies very slowly ($f_D T \to 0$). With the conventional differential detection method, even if the average $E_b/N_o$ is set large, the error rate approaches an error floor and does not becomes smaller. The present invention, however, permits reduction of the error rate by setting the average $E_b/N_o$ rate high.

As described above, the differential detection method according to the first embodiment enables the prediction coefficient λ to be changed in accordance with the fading environment of the received signal, and hence improves the error rate performance more than does the conventional differential detection method, regardless of whether fading exists or not.

Computer simulation results on the error rate performance in the case of applying the four-phase DPSK scheme to the second embodiment are indicated by the curve 37 in FIG. 5 and the curves 38 and 39 in FIG. 6. It is set that β=1. In this instance, the performance is somewhat inferior to that in the case of the first embodiment but superior to that in the case of the conventional differential detection method. The second embodiment has an advantage that the amount of processing required is far smaller than in the first embodiment because the number of survival paths at each point in time is limited to only one.

THIRD EMBODIMENT

In the above-described first and second embodiments, the reference signal $\hat{z}_{n-1}$ is generated by linearly predicting the fading variation from the samples $z_{n-1}$ and $z_{n-2}$ at only two preceding points in time. On this account, the fading variation tracking property is excellent, but when the fading variation is very small, the error rate performance becomes worse than that obtainable with the coherent detection. A description will be given of embodiments of the differential detection method which are adapted to generate the reference signal $\hat{z}_{n-1}$ to be used at the current time, on the basis of samples at all the preceding points in time by expressing it with a recursive formula containing the reference signal $\hat{z}_{n-2}$ used at the immediately preceding time (n−1).

The general construction of the differential detector circuit that employs the method of the third embodiment is the same as depicted in FIG. 1; hence, the third embodiment will be described with reference to FIG. 1. The basic operations of the reference signal adaptive estimation part 15, the branch metric calculating part 16 and the Viterbi decoding part 17 are the same as in the first embodiment, and the trellis diagram showing the state transition in the case of M=4 is the same as shown in FIG. 2. No general description will be repeated with respect to these blocks 15, 16 and 17, and the method of this third embodiment will be described below.

The method of the third embodiment comprises such steps as listed below.

(a) At each point in time there are M states $\Delta\phi_n$ that represent transmission phase differences at that point. In the case of selecting, from the M phase difference states $\Delta\phi_{n-1}$ at time (n−1), a state transition that is most likely to reach one of the states $\Delta\phi_n$ at time n, the reference signal $\hat{z}_{n-2}$ used at time (n−1) is phase rotated by $\Delta\phi_{n-1}$, and the phase-rotated signal and the received signal sample at time (n−1) are used to calculate the estimated value $\hat{z}_{n-1}$ of the reference signal to be used at time n, by the following equation:

$$\hat{z}_{n-1} = (1+\lambda)z_{n-1} - \lambda \hat{z}_{n-2} exp(j\Delta\phi_{n-1}) \quad (12)$$

The coefficient λ is a real number.

(b) Next, the estimated reference signal $\hat{z}_{n-1}$ is phase rotated by $\Delta\phi_n$ to obtain a candidate for the received signal sample at time n, and a square error between it and the received signal sample $z_n$ at time n, given by the following equation, is used as a branch metric $\mu(\Delta\phi_{n-1} \rightarrow \Delta\phi_n)$ that represents the likelihood of transition from the state $\Delta\phi_{n-1}$ at time (n−1) to the state $\Delta\phi_n$ at time n.

$$\mu(\Delta\phi_{n-1} \rightarrow \Delta\phi_n) = |z_n - \hat{z}_{n-1} exp(j\Delta\phi_n)|^2 \quad (13)$$

(c) The branch metric $\mu(\Delta\phi_{n-1} \rightarrow \Delta\phi_n)$ is added to the path metric $H(\Delta\phi_{n-1})$ in the state $\Delta\phi_{n-1}$ at time (n−1) to obtain the path metric $H(\Delta\phi_n|\Delta\phi_{n-1})$ of a candidate sequence that passes through the state $\Delta\phi_{n-1}$.

(d) The above steps (a) through (c) are carried out for each state $\Delta\phi_n$ at time n in correspondence with all the M states $\Delta\phi_{n-1}$ at time (n−1) to obtain M path metrics H for M candidate sequences, then the M path metrics H are compared in terms of magnitude and the state $\Delta\phi'_{n-1}$ that provides the minimum value is calculated. This state is stored in the path memory 17P as the state of the survival sequence (path) at time (n−1) that reaches the state $\Delta\phi_n$ at time n, and at the same time, its path metric $H(\Delta\phi_n|\Delta\phi'_{n-1})$ is stored in the metric memory 17M as the path metric $H(\Delta\phi_n)$ in the state $\Delta\phi_n$ at time n.

(e) The above steps (a) through (d) are carried out for each of the M states $\Delta\phi_n$ at time n to obtain M path metrics $H(\Delta\phi_n)$, which are compared in terms of magnitude, and the state $\Delta\phi'_n$ that provides the minimum value is calculated. The path memory is traced a fixed number K of points in time back from the state $\Delta\phi'_n$, and the state thus reached is outputted as the decoded symbol $\Delta\bar{\phi}_{n-K}$.

In the third embodiment described above, as is the case with the first embodiment, the prediction coefficient λ may also be adaptively set by calculating M survival paths at time n and tracing back each sequence so that an error between the received signal sample and its linearly predicted value is minimized by a recursive error minimizing algorithm. In such a case, one prediction coefficient λ is determined for each state at time n. Letting $\Delta\phi'_{n-i}$ (where i=0,1, . . . , n−1) represent the sequence on the path that reaches the state $\Delta\phi_n$ at time n, the prediction coefficient λ ($\Delta\phi_n$) for estimating a reference signal that is used at the next time (n+1) is selected in such a manner as to minimize an exponentially weighted mean square error that is given by the following equation:

$$J = \sum_{i=0}^{n-1} \beta^i |z_{n-i} - z'_{n-i} exp(j\Delta\phi'_{n-i})|^2 \quad (14)$$

where β is a forgetting factor equal to or smaller than 1 and $\hat{z}'_{n-1}$ is an estimated reference signal at time (n−i) obtained on the assumption that the prediction coefficients $\lambda(\Delta\phi_n)$ at all preceding points in time are the same. The estimated reference signal is given by the following equation.

$$\hat{z}'_{n-i} = \{1+\lambda(\Delta\phi_n)\}z_{n-1-i} - \lambda(\Delta\phi_n)\hat{z}_{n-2-i} exp(j\Delta\phi'_{n-1-i}) \quad (15)$$

The prediction coefficient $\lambda(\Delta\phi_n)$ that minimizes Eq. (14) is given by the following equation:

$$\lambda(\Delta\phi_n) = Re\left\{ \sum_{i=0}^{n-1} \beta^i [z_{n-i} - z_{n-1-i} exp(j\Delta\phi'_{n-1})] \times \right.$$
$$[z_{n-1-i} - \hat{z}_{n-2-i} exp(j\Delta\phi'_{n-1-i})]^* exp(-j\Delta\phi'_{n-i})\} \div$$
$$\left. \sum_{i=0}^{n-1} \beta^i |z_{n-1-i} \hat{z}_{n-2-i} exp(j\Delta\phi'_{n-1-i})|^2 \right. \quad (16)$$

As described previously with respect to the first embodiment, the prediction coefficient $\lambda(\Delta\phi_n)$ expressed by Eq. (16) can be recursively calculated as follows:

$$\lambda(\Delta\phi_n) = \Theta_n(\Delta\phi_n)/\Omega_n(\Delta\phi_n) \quad (17)$$

-continued $$\Omega_n(\Delta\phi_n) = |z_{n-1} - z_{n-2}exp(j\Delta\phi'_{n-1})|^2 + \beta\Omega^{n-1}(\Delta\phi'_{n-1})$$

$$\theta_n(\Delta\phi_n) = Re\{[z_n - z_{n-1}exp(j\Delta\phi_n)][z_{n-1} - z_{n-2}exp(j\Delta\phi'_{n-1})]^*\} +$$
$$\beta\theta_{n-1}(\Delta\phi'_{n-1})$$

$\Omega_0(\Delta\phi_0) = \delta$ (a small positive real number), $$\theta_0(\Delta\phi_0) = 0, z_{-1} = 0 \text{ and } \Delta\phi_0 = 0$$

The prediction coefficient $\lambda(\Delta\phi_n)$ thus obtained for each state at time n is used to calculate the reference signal $\hat{z}_n$ by Eq. (12) in step (a) for the sample $z_{n+1}$ at the next time (n+1).

Figure 7:
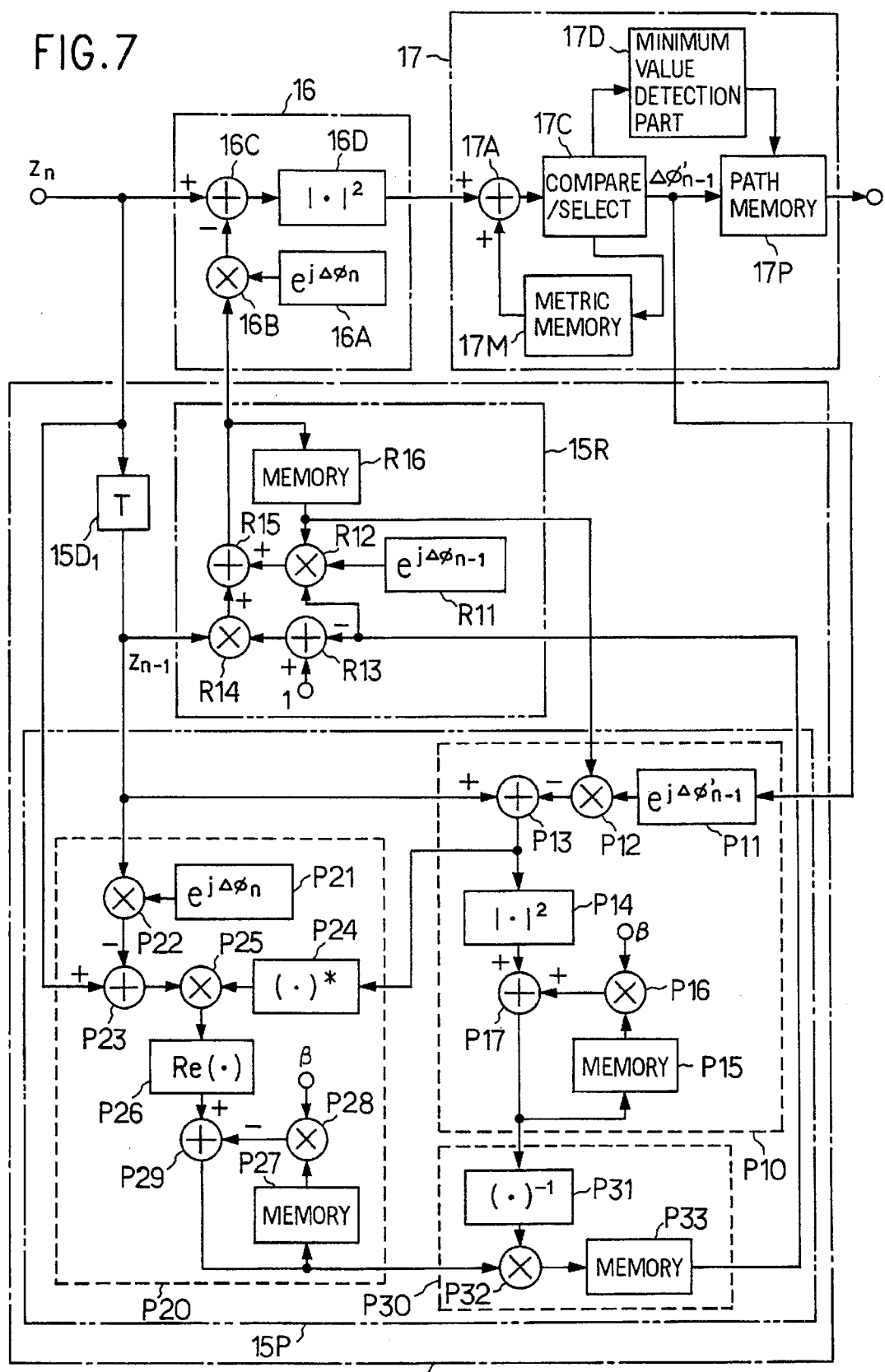
FIG. 7 is a block diagram illustrating an example of a detector which adaptively determines the prediction coefficient in accordance with a third embodiment of the present invention.

FIG. 7 illustrates in block form the reference signal adaptive estimation part 15, the branch metric calculating part 16 and the Viterbi decoding part 17 in the case of applying the differential detection method of the third embodiment to the adaptive determination of the prediction coefficient $\lambda$. This example is also designed to directly conduct the calculations by Eqs. (15) to (17) as in the case of FIG. 3. The $\Omega$ calculating part P10, the $\Theta$ calculating part P20 and the $\lambda$ calculating part P30 in the reference signal estimation part 15 are the same as those shown in FIG. 3 except that the multiplier P12 of the $\Omega$ calculating part P10 is supplied with the reference signal $\hat{z}_{n-2}$ from the reference signal calculating part 15R in place of the sample $z_{n-1}$ at time (n−1) and that the reference signal calculating part 15R is provided with a memory R16, from which the immediately preceding reference signal $\hat{z}_{n-2}$ stored therein is fed to the multiplier R12 instead of applying thereto the sample $z_{n-2}$ at time (n−2). In the memory R16 there are temporarily stored estimated reference signal candidates $z_{n-1}(\Delta\phi_n|\Delta\phi_{n-1})$ which are expressed by Eq. (12), calculated for all the states $\Delta\phi_{n-1}$ in step (a). After the compare/select part 17C of the Viterbi decoding part 17 determines the states $\Delta\phi'_{n-1}$ at time (n−1) that provides the minimum path metrics to the respective states at time n, $\hat{z}_{n-1}(\Delta\phi_n|\Delta\phi'_{n-1})$ corresponding to them are stored as estimated reference signals $\hat{z}_{n-1}(\Delta\phi_n)$ in the memory R16, the others being erased therefrom.

FOURTH EMBODIMENT

The fourth embodiment is intended to simplify the sequence estimation algorithm by limiting the number M of the survival paths at each time n in the third embodiment to one as in the second embodiment. The basic configuration of the differential detector circuit embodying this method is the same as depicted in FIG. 4 and employs the decision feedback decoding algorithm in place of the Viterbi decoding algorithm. The method of this embodiment comprises the steps described below.

(a) When it is decided which of the M states $\Delta\phi_n$ at time n is most likely to reach the phase difference state $\Delta\bar{\phi}_{n-1}$ decided at time (n−1), the reference signal $\hat{z}_{n-2}$ used at time (n−1) is phase rotated by the decided phase difference $\Delta\bar{\phi}_{n-1}$ at time (n−1), and an estimated value $\hat{z}_{n-1}$ of the reference signal, which is used at time n, is calculated from the phase-rotated signal and the received signal sample $z_{n-1}$ by the following equation with the prediction coefficient $\lambda$ set as a real number:

$$\hat{z}_{n-1} = (1+\lambda)z_{n-1} - \lambda\hat{z}_{n-2}exp(j\Delta\bar{\phi}_{n-1}) \quad (18)$$

(b) This reference signal estimated value $\hat{z}_{n-1}$ is phase-rotated by $\Delta\phi_n$ to obtain a received signal candidate at time n, and a real-number value of the inner product of the received signal candidate and the received signal sample $z_n$ is used as the branch metric $\mu(\Delta\phi_n)$ that represents the likelihood of transition from the state $\Delta\bar{\phi}_{n-1}$ at time (n−1) to the state $\Delta\phi_n$ at time n.

(c) The above steps (a) and (b) are performed for all of the M states $\Delta\phi_n$ at time n, then the resulting M branch metrics are compared in terms of magnitude and the state which provides the maximum branch metric is calculated and outputted as the decoded symbol $\Delta\bar{\phi}_n$.

Also in the above-described fourth embodiment, the prediction coefficient $\lambda$, which minimizes the error between the received signal sample and its estimated value, may be calculated by the recursive error minimizing algorithm tracing back the decoded sequence, after obtaining the decoded symbol $\Delta\bar{\phi}_n$ at time n. The scheme of the fourth embodiment differs from the prediction coefficient adaptive estimation scheme of the third embodiment in that the number of survival paths at each point in time is only one and that $\Delta\bar{\phi}_n$ is used in place of $\Delta\phi_n$. As mentioned previously, the prediction coefficient $\lambda$ is adaptively obtained by the following recursive calculation in the reference signal adaptive estimation part 15.

$$\lambda = \Theta_n/\Omega_n$$

$$\Omega_n = |(z_{n-1} - \hat{z}_{n-2}exp(j\Delta\bar{\phi}_{n-1})|^2 + \beta\Omega_{n-1}$$

$$\Theta_n = Re\{[z_n - z_{n-1}exp(j\Delta\bar{\phi}_n)][z_{n-1} - \hat{z}_{n-2}exp(j\Delta\bar{\phi}_{n-1})]^*\} + \beta\Theta_{n-1}$$

$\Theta_0 = \delta$ (a small positive real number), $\Theta_0 = 0$, $z_{-1} = 0$, $\Delta\bar{\phi}_0 = 0$ In the prediction coefficient adaptive estimation in the third and fourth embodiments, through utilization of the fact that the reference signal $\hat{z}_{n-1}$ becomes a signal estimated value at time n, the reference signal $\hat{z}_{n-1}$ is estimated by the recursive error minimizing algorithm in such a manner as to minimize an error J between the following reference signal at time (n−1−p) estimated using the reference signal at time (n−1) and a received signal sample. $z_{n-1-p}$.

$$\hat{z}'_{n-1-p} = \{\hat{z}_{n-1}exp(-j\Delta\phi_{n-1})\}exp(j\Delta\phi_{n-1-p})$$

where p=0, 1, 2, ..., n−1. The exponentially weighted mean square error given by the following equation is used as the error J:

$$J = \sum_{p=0}^{n-1} \beta^p |z_{n-1-p} - \hat{z}'_{n-1-p}|^2 \quad (19)$$

The estimated reference signal $\hat{z}_{n-1}$ that minimizes the error J is given by the following equation:

$$\hat{z}_{n-1} = \{(1-\beta)/(1-\beta^n)\}z_{n-1} + \{1-(1-\beta)/(1-\beta^n)\}\hat{z}_{n-2}exp(j\Delta\phi_{n-1}) \quad (20)$$

where $\beta$ is a positive forgetting factor equal to or smaller than 1. By changing the factor with time like this, the reference signal $\hat{z}_{n-1}$ can be converged fast. Then, it is also possible to estimate, by setting $\lambda = -1+(1-\beta)/(1-\beta^n)$, the signal $\hat{z}_{n-1}$ in such a manner as to minimize the exponentially weighted mean square value J of an estimation error at each point in time.

Figure 8:
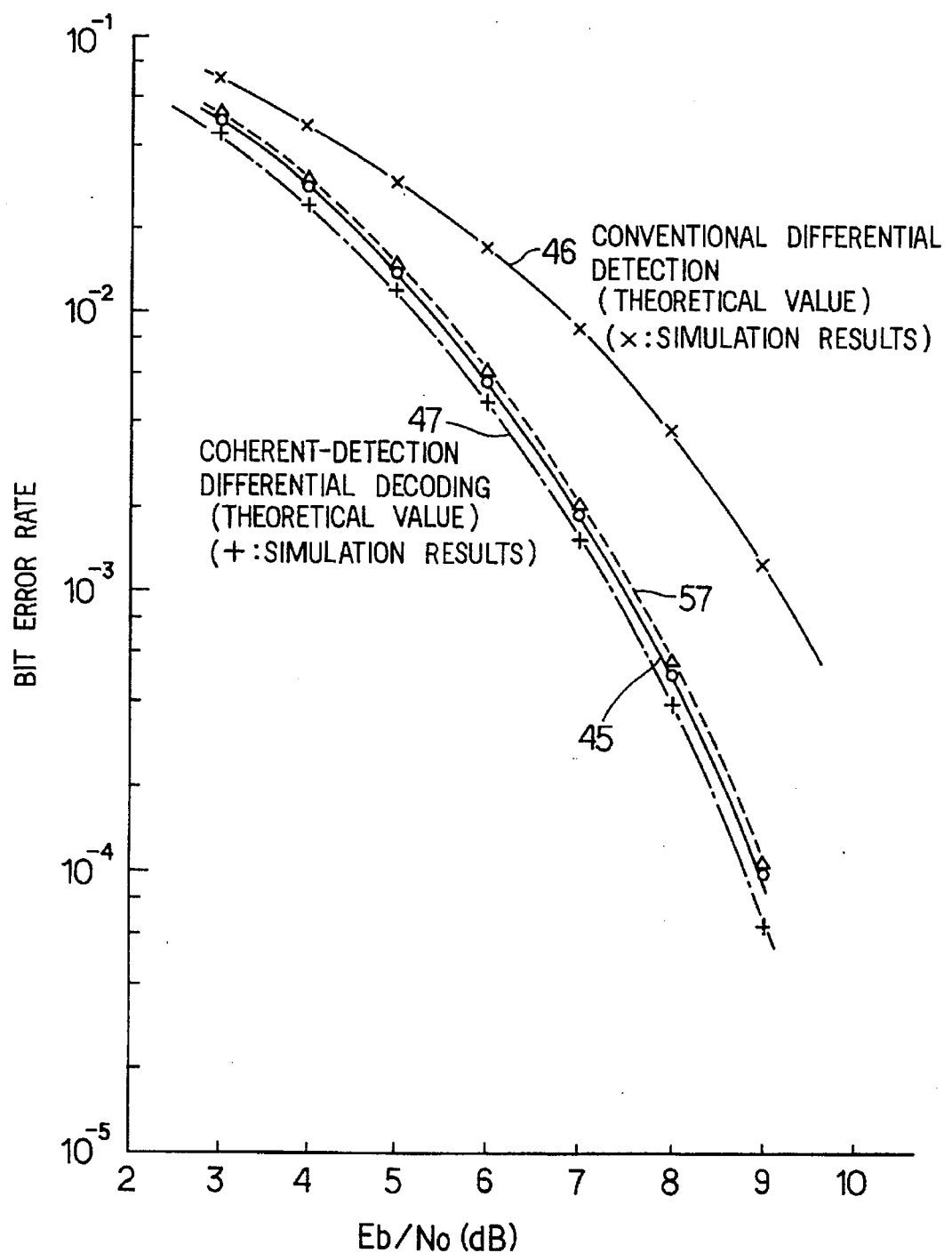
FIG. 8 is a graph showing simulation results on an error rate performance with respect to the signal energy per bit versus noise power spectrum density in the case where the third and fourth embodiments, which adaptively determine the prediction coefficient, are applied to the four-phase DPSK scheme, together with performances according to the conventional one-symbol differential detection method and coherent-detection, differential decoding method.

In FIG. 8 there are indicated by the solid line (marked with white circles) 45 computer simulation results on the error rate performance in a no-fading environment when the differential detection method which adaptively updates the prediction coefficient in the third embodiment is applied to the four-phase DPSK scheme. In this instance, $\beta=1$. The abscissa in FIG. 8 represents the signal energy per bit versus noise power spectrum density ratio, $E_b/B_o$. For comparison, there are plotted by points x and + simulation results on the error rate in the cases of the conventional one-symbol differential detection and coherent-detection differential decoding, respectively, and their theoretical values by the curves 46 and 47. The difference between the one-symbol phase differential detection and the coherent-detection, differential decoding in the ratio $E_b/N_o$ necessary for achieving an error rate of 0.1% is 1.8 dB, but in the third embodiment of the present invention, the difference can be reduced down to 0.2 dB or less.

Figure 9:
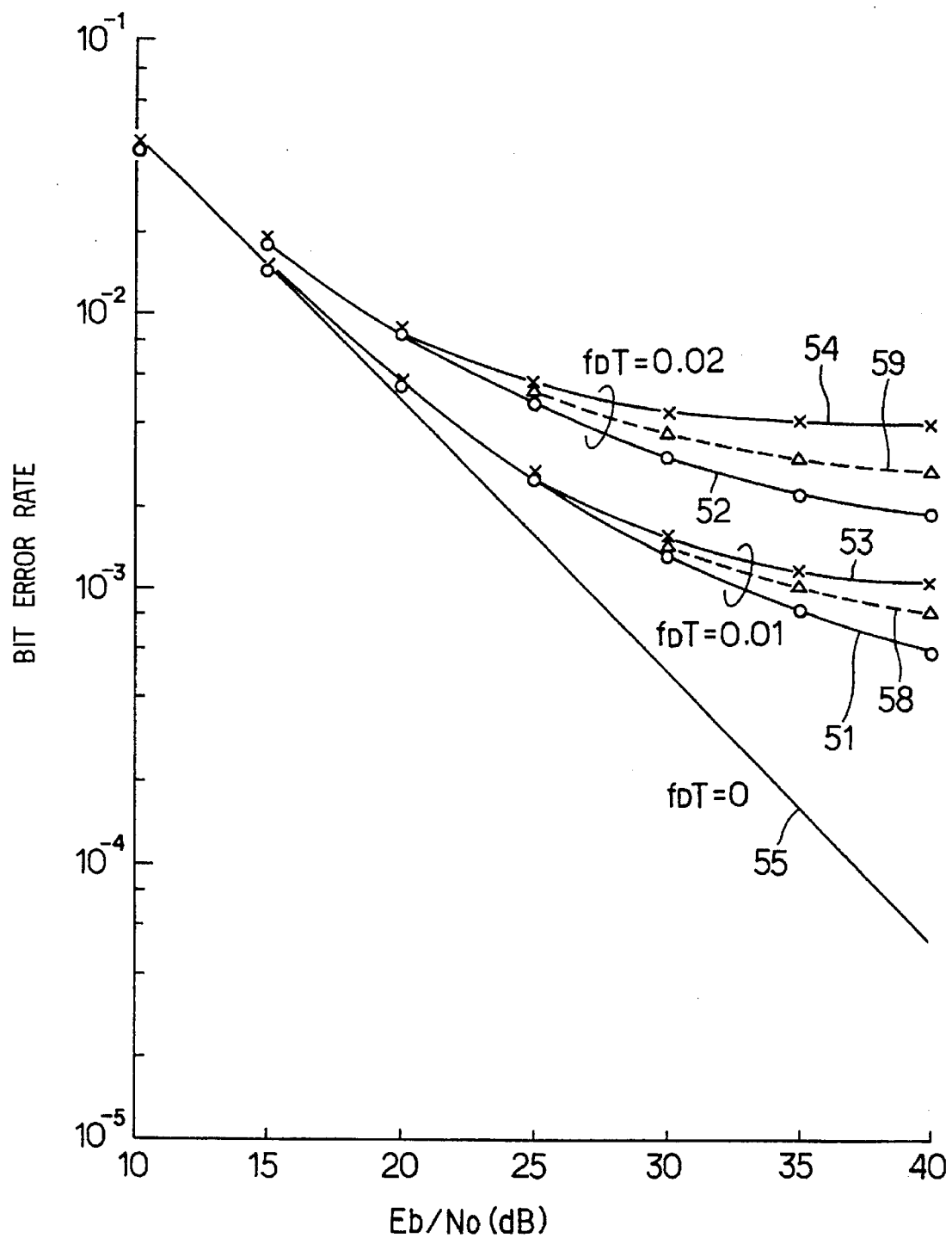
FIG. 9 is a graph showing performances similar to those in FIG. 8 but in the Rayleigh fading environment.

In FIG. 9 there are indicated by the solid lines marked with white circles) 51 and 52 bit error rate performances in a Rayleigh fading environment when the third embodiment is applied to the afore-mentioned DPSK scheme. The abscissa represents a mean $E_b/N_o$ ratio. The solid line 51 indicates the case where $f_DT=0.01$ and the solid line 52 the case where $f_DT=0.02$, where $f_DT$ represents the rate of fading variation, $f_D$ the maximum Doppler frequency (speed of travel of mobile terminal/wavelength of radio carrier) and T the length of one symbol (where 1/T is the transmission rate). The curves 53 and 54 indicate the performances by the conventional one-symbol differential detection method in the cases of $f_Dt=0.01$ and 0.02, respectively. For comparison, there is indicated by the curve 55 the performance obtained with the differential detection method when fading varies very slowly ($f_DT\rightarrow 0$). With the conventional differential detection method, even if the average $E_b/N_o$ ratio is set large, the error rate approaches an error floor and does not become smaller. The present invention, however, permits reduction of the error rate by setting the average $E_b/N_o$ ratio high.

As described above, the differential detection method according to the third embodiment estimates the reference signal in accordance with the fading environment of the received signal, and hence improves the error rate performance more than does the conventional differential detection method, regardless of whether fading exists or not.

Computer simulation results on the error rate performance in the case of applying the differential detection method according to the fourth embodiment of the present invention to the four-phase DPSK scheme are indicated by the curve 57 (marked with triangles) in FIG. 8 and the curves 58 and 59 (marked with triangles) in FIG. 9. It is set that $\beta=1$. In this instance, the performance is somewhat inferior to that in the case of the third embodiment but superior to that in the case of the conventional differential detection method. The method of the fourth embodiment has an advantage that the amount of processing required is far smaller than that needed by the method of the third embodiment.

In any of its embodiments, according to the present invention, the reference signal is estimated taking into account the preceding received signal and reference signal especially in a no-fading environment—this ensures a correct estimation and significantly improves the error rate performance as compared with that obtainable with the conventional differential detection method.

I claim:

1. A differential detection method for an M-level differentially phase-modulated signal, M being an integer equal to or greater than 3, said method comprising the steps of:

(a) sampling a received signal with a transmitted symbol period to obtain received signal samples $z_n$ at a series of points in time n;

(b) rotating the phase of a received signal sample $z_{n-2}$ at time (n−2) by one, $\Delta\phi_{n-1}$, of M states and calculating a linearly predicted value $\hat{z}_{n-1}$ of a received signal sample $z_{n-1}$ at time (n−1) containing a fading variation at time n on the basis of the phase-rotated signal and the received signal sample $z_{n-1}$ at time (n−1) by the following equation setting a prediction coefficient $\lambda$ as a real number, $$\hat{z}_{n-1}=(1+\lambda)z_{n-1}-\lambda z_{n-2}exp(j\Delta\phi_{n-1});$$

(c) rotating the phase of said linearly predicted value $\hat{z}_{n-1}$ by $\Delta\phi$ and calculating a square error between the phase-rotated signal and the received signal sample $z_n$ at time n, $$\mu(\Delta\phi_{n-1}\rightarrow\Delta\phi_n)=|z_n-\hat{z}_{n-1}exp(j\Delta\phi_n)|^2,$$

as a branch metric representing the likelihood of transition from the state $\Delta\phi_{n-1}$ at time (n−1) to the state $\Delta\phi_n$ at time n;

(d) adding said branch metric to a branch metric $H(\Delta\phi_{n-1})$ in the state $\Delta\phi_{n-1}$ at time (n−1) to obtain a path metric of a candidate sequence which passes through the state $\Delta\phi_{n-1}$;

(e) repeating the above steps (b) to (d) for one state $\Delta\phi_n$ at time n for all of the M states $\Delta\phi_{n-1}$ at time n−1 to obtain path metrics $H(\Delta\phi_n|\Delta\phi_{n-1})$ for M candidate sequences, comparing the M path metrics $H(\Delta\phi_n|\Delta\phi_{n-1})$ in terms of magnitude, calculating a state $\Delta\phi'_{n-1}$ that provides the minimum path metric, storing it in a path memory as the state at time (n−1) on a survival path that reaches the state $\Delta\phi_n$ at time n, and storing its path metric $H(\Delta\phi_n|\Delta\phi'_{n-1})$ in a metric memory as a path metric $H(\Delta\phi_n)$ in the state $\Delta\phi_n$ at time n; and (f) repeating the steps (b) to (e) for all of the M states $\Delta\phi_n$ at time n to obtain M path metrics, comparing the M path metrics in terms of magnitude, calculating a state $\Delta\phi'_n$ that provides the minimum path metric, tracing back the path memory by a fixed number K of points in time starting at the state $\Delta\phi'_n$, and outputting the thus reached state as a decoded symbol $\Delta\bar{\phi}_{n-K}$.

2. The method of claim 1, wherein said step (f) includes a step of calculating a prediction coefficient $\lambda$, which minimizes an error between a received signal sample and its linearly predicted value, by tracing back each survival sequence through the use of a recursive error minimizing algorithm after calculating survival paths to said M states $\Delta\phi_n$ at time n.

3. A differential detection method for an M-level differentially phase-demodulated signal, M being an integer equal to or greater than 3, said method comprising the steps of:

(a) sampling a received signal with a transmitted symbol period to obtain a received signal sample $z_n$ at time n;

(b) rotating the phase of a received signal sample $z_{n-2}$ at time n by a phase difference state $\Delta\bar{\phi}_{n-1}$ decided at the immediately preceding time (n−1) and calculating a linearly predicted value $\hat{z}_{n-1}$ of a received signal sample at time (n−1) containing a fading variation at time n on the basis of the phase-rotated signal and a received signal sample $z_{n-1}$ by the following equation setting a prediction coefficient $\lambda$ as a real number, $$\hat{z}_{n-1}=(1+\lambda)z_{n-1}-\lambda z_{n-2}exp(j\Delta\bar{\phi}_{n-1});$$

(c) rotating the phase of said linearly predicted value $\hat{z}_{n-1}$ by $\Delta\phi_n$ to obtain a candidate for a received signal at time n, and calculating a real value of the inner product of the received signal candidate and the received signal sample $z_n$ as a branch metric $\mu(\Delta\phi_n)$ of transition from the state $\Delta\phi_{n-1}$ at time (n−1) to the state $\Delta\phi_n$ at time n; and (d) repeating said steps (b) and (c) for all of M states $\Delta\phi_n$ at time n, comparing M resulting branch metrics in terms of magnitude, calculating a state $\Delta\phi_n$ that provides the maximum branch metric, and outputting it as a decoded symbol $\Delta\bar{\phi}_n$.

4. The method of claim 3, wherein said step (d) includes a step of calculating a prediction coefficient $\lambda$, which minimizes an error between a received signal sample and its linearly predicted value, by tracing back a decoded sequence through the use of a recursive error minimizing algorithm after calculating said decoded symbol $\Delta\bar{\phi}_n$ at time n.

5. A differential detection method for an M-level differentially phase-modulated signal, M being an integer equal to or greater than 3, said method comprising the steps of:

(a) sampling a received signal with a transmitted symbol period to obtain a received signal sample at time n;

(b) rotating the phase of a reference signal $\hat{z}_{n-2}$ used at time (n−1) by $\Delta\phi_{n-1}$, and calculating an estimated value $\hat{z}_{n-1}$ to be used at time n on the basis of the phase-rotated signal and a received signal sample $z_{n-1}$ by the following equation setting a prediction coefficient $\lambda$ as a real number, $$\hat{z}_{n-1}=(1+\lambda)z_{n-1}-\lambda\hat{z}_{n-2}exp(j\Delta\phi_{n-1});$$

(c) calculating, as a branch metric, a square error between a signal phase-rotated $\Delta\phi_n$ from said estimated reference signal $\hat{z}_{n-1}$ and the received signal sample $z_n$;

(d) adding said branch metric to the path metric $H(\Delta\phi_{n-1})$ in a state $\Delta\phi_{n-1}$ at time (n−1) to obtain the path metric $H(\Delta\phi_n|\Delta\phi_{n-1})$ of a candidate sequence that passes through the state $\Delta\phi_{n-1}$;

(e) repeating said steps (b) to (d) for all of M states $\Delta\phi_{n-1}$ at time (n−1) in connection with one state $\Delta\phi_n$ at time n to obtain M path metrics for M candidate sequences, comparing the M path metrics in terms of magnitude, calculating a state $\Delta\phi'_{n-1}$ that provides the minimum path metric, storing it in a path memory as the state of a survival path at time (n−1) that reaches the state $\Delta\phi_n$ at time n, and storing the path metric $H(\Delta\phi_n|\Delta\phi'_n)$ of the survival path as the path metric $H(\Delta\phi_n)$ in the state $\Delta\phi_n$ at time n in a metric memory; and (f) repeating said steps (b) to (e) for all of M states $\Delta\phi_n$ at time n to obtain M path metrics, comparing the M path metrics in terms of magnitude, calculating a state $\Delta\phi'_n$ that provides the minimum path metric, tracing back said path memory by a fixed number K of points in time from the state $\Delta\phi'_n$, and outputting the thus reached state as a decoded symbol $\Delta\bar{\phi}_{n-K}$.

6. The method of claim 5, wherein said step (f) includes a step of calculating a prediction coefficient $\lambda$, which minimizes an error between a received signal sample and its linearly predicted value, by tracing back each survival sequence through the use of a recursive error minimizing algorithm after calculating survival paths to said M states $\Delta\phi_n$ at time n.

7. A differential detection method for an M-level differentially phase-modulated signal, M being an integer equal to or greater than 3, said method comprising the steps of:

(a) sampling a received signal with a transmitted symbol period to obtain a received signal sample $z_n$ at time n;

(b) rotating the phase of a reference signal $z_{n-2}$ at time n by a phase difference state $\Delta\bar{\phi}_{n-1}$ decided at the immediately preceding time (n−1) and calculating an estimated value $\hat{z}_{n-1}$ of a reference signal at time n on the basis of the phase-rotated signal and a received signal sample $z_{n-1}$ by the following equation setting a prediction coefficient $\lambda$ as a real number, $$\hat{z}_{n-1}=(1+\lambda)z_{n-1}-\lambda\hat{z}_{n-2}exp(j\Delta\bar{\phi}_{n-1});$$

(c) rotating the phase of said estimated value $\hat{z}_{n-1}$ by $\Delta\phi_n$ to obtain a candidate for a received signal at time n, and calculating a real value of the inner product of the received signal candidate and the received signal sample $z_n$ as the branch metric of transition from the state $\Delta\bar{\phi}_{n-1}$ at time (n−1) to the state $\Delta\phi_n$ at time n; and (d) repeating said steps (b) and (c) for all of M states $\Delta\phi_n$ at time n, comparing M thus obtained branch metrics in terms of magnitude, calculating a state $\Delta\phi_n$ that provides the maximum branch metric, and outputting it as a decoded symbol $\Delta\bar{\phi}_n$.

8. The method of claim 7, wherein said step (d) includes a step of calculating a prediction coefficient $\lambda$, which minimizes an error between a received signal sample and its linearly predicted value, by tracing back a decoded sequence through the use of a recursive error minimizing algorithm after calculating said decoded symbol $\Delta\bar{\phi}_n$ at time n.

9. The method of claim 5, further comprising the step of calculating said prediction coefficient $\lambda$ as a function of time n which is given by the following equation, with a coefficient $\beta$ set as a positive value equal to or smaller than 1, $$\lambda=-1+(1-\beta)/(1-\beta^n).$$

10. The method of claim 7, further comprising the step of calculating said prediction coefficient $\lambda$ as a function of time n which is given by the following equation, with a coefficient $\beta$ set as a positive value equal to or smaller than 1, $$\lambda=-1+(1-\beta)/(1-\beta^n).$$

* * * * *